US009054617B2

(12) United States Patent
Kawai

(10) Patent No.: US 9,054,617 B2
(45) Date of Patent: Jun. 9, 2015

(54) CONTROL DEVICE OF PERMANENT MAGNET SYNCHRONOUS MOTOR FOR PREVENTING IRREVERSIBLE DEMAGNETIZATION OF PERMANENT MAGNET AND CONTROL SYSTEM INCLUDING THE SAME

(71) Applicant: Fanuc Corporation, Minamitsuru-gun, Yamanashi (JP)

(72) Inventor: Kenji Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 14/019,121

(22) Filed: Sep. 5, 2013

(65) Prior Publication Data

US 2014/0062362 A1 Mar. 6, 2014

(30) Foreign Application Priority Data

Sep. 6, 2012 (JP) ................................. 2012-196402

(51) Int. Cl.
*H02P 9/00* (2006.01)
*H02P 3/22* (2006.01)
*H02P 29/00* (2006.01)

(52) U.S. Cl.
CPC .............. *H02P 3/22* (2013.01); *H02P 29/0066* (2013.01)

(58) Field of Classification Search
CPC ............. H02P 9/12; H02P 9/123; H02P 3/12; H02P 3/22
USPC ................................ 318/400.01, 400.02, 700
See application file for complete search history.

(56) References Cited

U.S. PATENT DOCUMENTS

| 6,427,794 B1 | 8/2002 | Raftari et al. | |
|---|---|---|---|
| 7,622,883 B2 * | 11/2009 | Kaizuka et al. | 318/730 |
| 2007/0090783 A1 | 4/2007 | Rainer et al. | |
| 2008/0129237 A1 * | 6/2008 | Atarashi et al. | 318/492 |
| 2014/0354204 A1 * | 12/2014 | Tachibana et al. | 318/473 |

FOREIGN PATENT DOCUMENTS

| DE | 10243217 A1 | 5/2003 |
|---|---|---|
| JP | 421377 A | 1/1992 |
| JP | 11-018496 A | 1/1999 |

(Continued)

*Primary Examiner* — Rina Duda
*Assistant Examiner* — Bickey Dhakal
(74) *Attorney, Agent, or Firm* — Lowe Hauptman & Ham, LLP

(57) ABSTRACT

A maximum current value determination unit determines the maximum current value of a permanent magnet synchronous motor in order to prevent irreversible demagnetization of a permanent magnet of the permanent magnet synchronous motor from occurring due to transient current occurring at the time of short-circuiting of three phases, based on one of a set of irreversible demagnetization causing current value corresponding to permanent magnet temperature and the transient current occurring at the time of the short-circuiting of three phases, and a set of irreversible demagnetization causing magnetic field intensity corresponding to the permanent magnet temperature and demagnetization field intensity of the permanent magnet of the permanent magnet synchronous motor occurring at the time of the short-circuiting of three phases. A current control unit controls the current of the permanent magnet synchronous motor so that the current value of the permanent magnet synchronous motor is less than the maximum current value.

2 Claims, 6 Drawing Sheets

(56) References Cited

FOREIGN PATENT DOCUMENTS

| | | |
|---|---|---|
| JP | 2003-235286 A | 8/2003 |
| JP | 2006-254521 A | 9/2006 |
| JP | 2008182821 A | 8/2008 |
| JP | 2009-005553 A | 1/2009 |
| JP | 2009198139 A | 9/2009 |
| JP | 201216274 A | 1/2012 |
| WO | 2005/048446 A1 | 5/2005 |

* cited by examiner

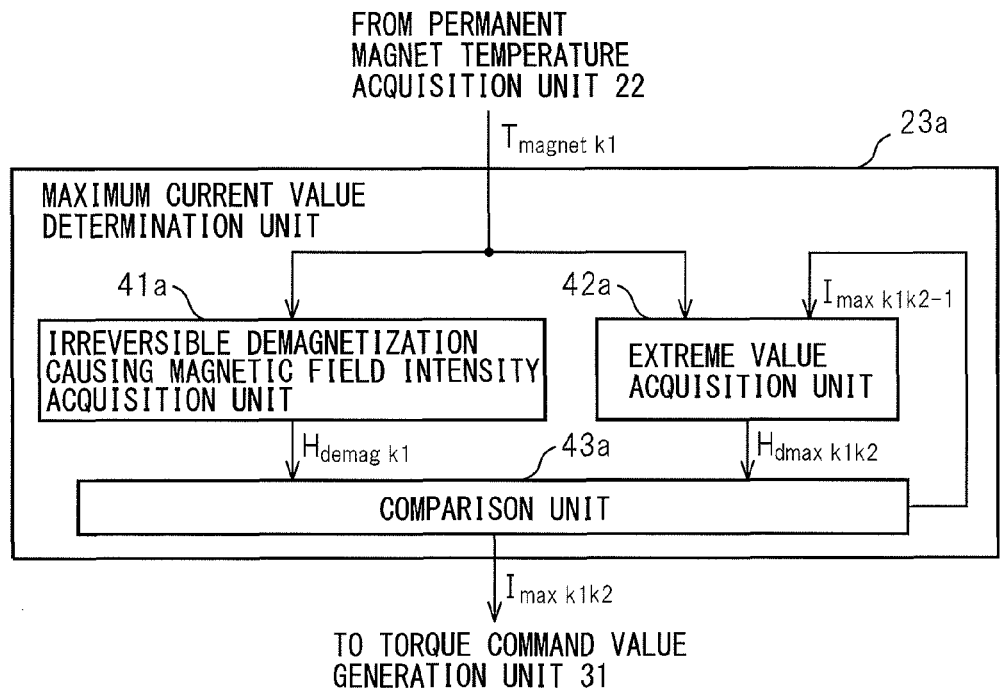
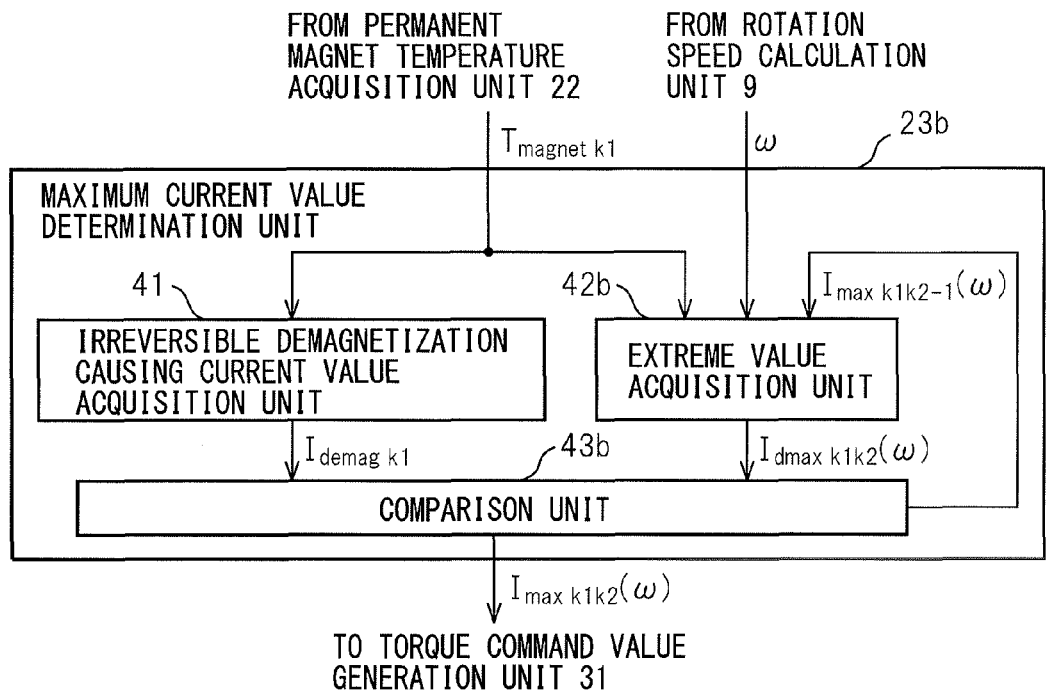

CONTROL DEVICE OF PERMANENT MAGNET SYNCHRONOUS MOTOR FOR PREVENTING IRREVERSIBLE DEMAGNETIZATION OF PERMANENT MAGNET AND CONTROL SYSTEM INCLUDING THE SAME

RELATED APPLICATIONS

The present application is based on, and claims priority from, Japanese Application Number 2012-196402, filed Sep. 5, 2012, the disclosure of which is hereby incorporated by reference herein in its entirety.

BACKGROUND OF THE INVENTION

1. Field of the Invention

The present invention relates to a control device of a permanent magnet synchronous motor for preventing irreversible demagnetization of a permanent magnet of a permanent magnet synchronous motor, and a control system including such a control device.

2. Description of Related Art

When controlling a permanent magnet synchronous motor, there is a case where it is no longer possible for the permanent magnet synchronous motor to generate a torque quickly and stably due to irreversible demagnetization caused by a rise in permanent magnet temperature of a permanent magnet of the permanent magnet synchronous motor. Because of this, various kinds of motor control devices for preventing irreversible demagnetization of the permanent magnet of the permanent magnet synchronous motor are well known.

For example, as a conventional motor control device for preventing irreversible demagnetization of a permanent magnet of a permanent magnet synchronous motor, a motor control device configured to estimate a permanent magnet temperature, predict a short circuit current value in the case where a failure of a switching element of a power converter occurs at the estimated permanent magnet temperature, and limit the maximum speed of a permanent magnet synchronous motor so that the predicted short circuit current value is equal to or less than a current value at which irreversible demagnetization occurs in the permanent magnet (irreversible demagnetization causing current value), is disclosed in, for example, Japanese Unexamined Patent Publication (Kokai) No. 2009-5553 (JP2009-5553A).

Further, as a conventional motor control device for preventing irreversible demagnetization of a permanent magnet of a permanent magnet synchronous motor, a motor control device for preventing occurrence of irreversible demagnetization by increasing the carrier frequency of a power converter or by changing the modulation scheme inside the power converter from the two-phase one to the three-phase one in order to reduce the permanent magnet temperature in the case where there is a possibility that irreversible demagnetization occurs while the permanent magnet synchronous motor is being driven, is disclosed in, for example, Japanese Unexamined Patent Publication (Kokai) No. 2006-254521 (JP2006-254521A).

Furthermore, as a conventional motor control device for preventing irreversible demagnetization of a permanent magnet of a permanent magnet synchronous motor, a control device of a permanent magnet synchronous motor configured to adjust the output of a permanent magnet synchronous motor in accordance with the permanent magnet temperature of a permanent magnet of the permanent magnet synchronous motor, is proposed in, for example, Japanese Unexamined Patent Publication (Kokai) No. 11-18496 (JP11-18496A) and Japanese Unexamined Patent Publication (Kokai) No. 2003-235286 (JP2003-235286).

Because of its inherent characteristics, the permanent magnet synchronous motor may operate as a power generator at emergency of the permanent magnet synchronous motor (for example, at the time of power failure of the power source configured to supply power to the permanent magnet synchronous motor). When the permanent magnet synchronous motor operates as a generator, there is a case where a problem, such as burn-out, occurs due to excessive voltage produced in the permanent magnet synchronous motor itself and a motor control device for controlling the permanent magnet synchronous motor. As measures against such a problem, normally, the three phases of the power lines of the permanent magnet synchronous motor are short-circuited by a short-circuiting device when the permanent magnet synchronous motor is abnormal, thereby the permanent magnet synchronous motor is stopped safely.

In the case where the three phases of the power lines of the permanent magnet synchronous motor are short-circuited by the short-circuiting device at emergency of the permanent magnet synchronous motor, a transient current is produced. The transient current produced in such a manner flows in the direction in which the permanent magnet of the permanent magnet synchronous motor is demagnetized, and therefore, there is a possibility that irreversible demagnetization occurs in the permanent magnet of the permanent magnet synchronous motor.

In the conventional motor control devices described above, no measures are taken against the transient produced in the case where the three phases of the power lines of the permanent magnet synchronous motor are short-circuited, and therefore, it is not possible to prevent irreversible demagnetization of the permanent magnet of the permanent magnet synchronous motor caused by the transient current produced in the case where the three phases of the power lines of the permanent magnet synchronous motor are short-circuited.

SUMMARY OF THE INVENTION

As an aspect, the present invention provides a control device of a permanent magnet synchronous motor for preventing irreversible demagnetization of a permanent magnet of the permanent magnet synchronous motor caused by a transient current produced in the case where the three phase of the power lines of the permanent magnet synchronous motor are short-circuited, and a control system including such a control device.

According to an aspect of the present invention, the control device of a permanent magnet synchronous motor includes a short circuit control unit configured to short-circuit the three phases of the power lines of the permanent magnet synchronous motor by a short-circuiting device in order to stop the permanent magnet synchronous motor safely in an emergency, a permanent magnet temperature acquisition unit configured to acquire the permanent magnet temperature of the permanent magnet of the permanent magnet synchronous motor, a maximum current value determination unit configured to determine the maximum current value of a permanent magnet synchronous motor in order to prevent irreversible demagnetization of a permanent magnet of the permanent magnet synchronous motor that may occur by transient current occurring at the time of short-circuiting of three phases, based on one of a set of irreversible demagnetization causing current value corresponding to the permanent magnet temperature and the transient current occurring at the time of the short-circuiting of three phases, and a set of irreversible demagnetization causing magnetic field intensity corresponding to the permanent magnet temperature and demagnetization field intensity of the permanent magnet of the permanent magnet synchronous motor occurring at the time of the short-circuiting of three phases, and a current control unit configured to control the current of the permanent magnet synchronous motor so that the current value of the permanent magnet synchronous motor is less than the maximum current value.

Preferably, the maximum current value determination unit determines the maximum current value, based on one of a set of the irreversible demagnetization causing current value corresponding to the permanent magnet temperature and an extreme value of the transient current occurring at the time of the short-circuiting of three phases, and a set of an irreversible demagnetization causing magnetic field intensity corresponding to the permanent magnet temperature and an extreme value of the demagnetization field intensity of the permanent magnet of the permanent magnet synchronous motor occurring at the time of the short-circuiting of three phases.

Preferably, the maximum current value determination unit determines the maximum current value for each rotation speed of the permanent magnet synchronous motor.

Preferably, the current control unit performs control so as to drive the permanent magnet synchronous motor while suppressing an induced voltage caused by the permanent magnet of the permanent magnet synchronous motor by supplying a current including a reactive current component to the permanent magnet synchronous motor when the rotation speed of the permanent magnet synchronous motor is between a first rotation speed exceeding zero and a second rotation speed higher than the first rotation speed.

The control system according to the present invention includes a permanent magnet synchronous motor and the control device of a permanent magnet synchronous motor according to the present invention.

Preferably, the control system according to the present invention further includes a short-circuiting device configured to short-circuit the three phases of the power lines of the permanent magnet synchronous motor.

According to an aspect of the present invention, it is possible to prevent irreversible demagnetization of the permanent magnet of the permanent magnet synchronous motor caused by the transient current produced when the three phases of the power lines of the permanent magnet synchronous motor are short-circuited.

BRIEF DESCRIPTION OF THE DRAWINGS

The objects, features, and advantages of the present invention will be clear based on the following embodiments relating to the accompanying drawings. In the drawings.

FIG. 6 is a block diagram illustrating another example of the maximum current value determination unit in detail;

FIG. 7 is a block diagram illustrating another example of the maximum current value determination unit in detail.

DETAILED DESCRIPTION

Figure 1:
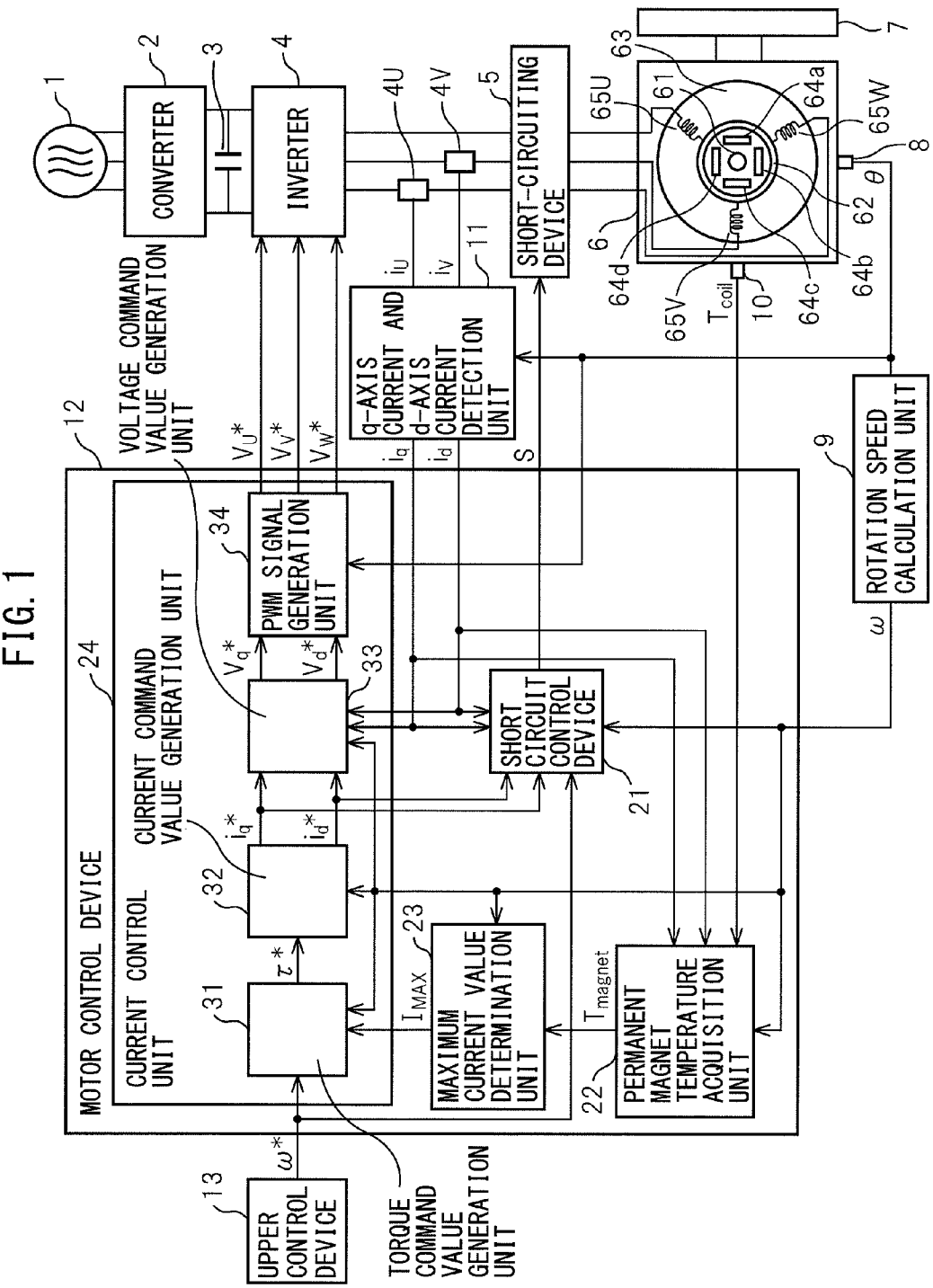
FIG. 1 is a block diagram of a control system having a motor control device of an embodiment of the present invention.

Embodiments of the motor control device according to the present invention are explained with reference to the drawings. In the drawings, the same symbols are attached to the same components.

Referring to the drawings, FIG. 1 is a block diagram of a control system having a motor control device of an embodiment of the present invention. The control system illustrated in FIG. 1 has a three-phase alternating-current power source 1, a converter 2, a smoothing capacitor 3, an inverter 4, a short-circuiting device 5, a permanent magnet synchronous motor 6, a driven object 7, a rotation angle sensor 8, a rotation speed calculation unit 9, a coil temperature sensor 10, a q-axis current and d-axis current detection unit 11, a motor control device 12, and an upper control device 13.

The converter 2 consists of a plurality (six, in the case of three-phase alternating current) of rectifier diodes, for example, and converts alternating-current power supplied from the three-phase alternating-current power source 1 into direct-current power. The smoothing capacitor 3 is connected in parallel to the converter 2 in order to smooth a voltage rectified by the rectifier diode of the converter 2. The inverter 4 is connected in parallel to the smoothing capacitor 3, consists of a plurality (six in the case of three-phase alternating current) of rectifier diodes and transistors connected in inverse parallel to the rectifier diodes, respectively, for example, and converts the direct-current power into which converted by the converter 2 into alternating-current power by turning on and off the transistor based on PWM signals $V_U^*$, $V_V^*$, and $V_{VW}^*$, explained later.

The short-circuiting device 5 consists of a switch or relay, for example, and short-circuits three phases of power lines 5U, 5V, and 5W of the permanent magnet synchronous motor 6 in response to a short circuit command S, to be explained later. The permanent magnet synchronous motor 6 may be any motor to which the driven object 7, such as a table connected to the permanent magnet synchronous motor 6, an arm connected thereto, and a work attached to the table or the arm and detached from the table or the arm, is connected and which is configured to change the position and attitude of the table that holds the work in a machine tool or to rotate and operate an arm of a robot, etc. In the present embodiment, the permanent magnet synchronous motor 6 is a rotary permanent magnet synchronous motor including a rotor 62 having a rotating shaft 61 to which the rotation angle sensor 8 is attached and a stator 63 arranged so as to surround the rotor 62.

The rotor 62 has permanent magnets 64a, 64b, 64c, and 64d. The stator 63 has coils 65u, 65v, and 65w arranged at 120° intervals and to which a U-phase current $i_U$, a V-phase current $i_V$, and a W-phase current $i_W$ as currents of the three phases of a first-phase current, a second-phase current, and a third-phase current are supplied, respectively. Consequently, the permanent magnet synchronous motor 6 functions as a three-phase synchronous motor.

The rotation angle sensor 8 consists of a rotary encoder configured to detect a rotation angle θ of the rotor 62 as a position of the rotor. The rotation speed calculation unit 9 calculates a rotation speed ω of the rotor 62 relating to the frequency of the U-phase current $i_U$, the V-phase current $i_V$, and the W-phase current $i_W$ as the rotation speed of the permanent magnet synchronous motor 6 by differentiating the rotation angle θ, which is input to the rotation speed calculation unit 9, with respect to time, and outputs the rotation speed ω to the motor control device 12. The temperature sensor 10 detects a coil temperature $T_{coil}$ of the coils 65u, 65v, and 65w and consists of a thermistor, for example.

The q-axis current and d-axis current detection unit 11 detects a q-axis current $i_q$ and a d-axis current $i_d$ based on the U-phase current $i_U$ and the V-phase current $i_V$ flowing through the permanent magnet synchronous motor 6 and the rotation angle θ. To do this, the q-axis current and d-axis current detection unit 11 consists of a coordinate converter configured to perform rotation coordinate conversion and three-phase to two-phase conversion. Consequently, the q-axis current and d-axis current detection unit 11 converts the U-phase current $i_U$ and the V-phase current $i_V$ in the stationary coordinate system (UVW coordinate system) into the q-axis current $i_q$ and the d-axis current $i_d$ expressed by the rotation coordinate system rotated by the rotation angle θ with respect to the stationary coordinate system (αβ coordinate system), and outputs the q-axis current $i_q$ and the d-axis current $i_d$ to the motor control device 12.

In this case, the U-phase current $i_U$ and the V-phase current $i_V$ are detected by current detection units 4U and 4V provided in the output lines of the inverter 4 and current detection signals output from the current detection units 4U and 4V are input to an A/D converter, not illustrated schematically, and converted into digital data. The current detection units 4U and 4V consist of hole elements, for example.

As will be explained later in detail, the motor control device 12 prevents irreversible demagnetization of the permanent magnets 64a, 64b, 64c, and 64d of the permanent magnet synchronous motor 6. To do this, the motor control device 12 has a short circuit control unit 21, a permanent magnet temperature acquisition unit 22, a maximum current value determination unit 23, and a current control unit 24.

In the present embodiment, the q-axis current and d-axis current detection unit 11 and the motor control device 12 perform vector control to independently control the q-axis current and the d-axis current of the permanent magnet synchronous motor 6 in order to generate a torque of the permanent magnet synchronous motor 6 both quickly and stably.

Further, in the present embodiment, the rotation speed calculation unit 9, the q-axis current and d-axis current detection unit 11, the short circuit control unit 21, the permanent magnet temperature acquisition unit 22, the maximum current value determination unit 23, and the current control unit 24 are implemented by a processor including an input/output port, a serial communication circuit, an A/D converter, a timer, etc., and perform various kinds of processing in accordance with processing programs stored in a memory not illustrated schematically.

The short circuit control unit 21 causes the short-circuiting device 5 to short-circuit the three phases of the power lines 5U, 5V, and 5W in order to stop the permanent magnet synchronous motor 6 safely at emergency of the permanent magnet synchronous motor 6. In order to determine whether or not emergency has occurred in the permanent magnet synchronous motor 6, to the short circuit control unit 21, the rotation speed ω is input from the rotation speed calculation unit 9, the q-axis current $i_q$ and the d-axis current $i_d$ are input from the q-axis current and d-axis current detection unit 11, a rotational speed command value ω* is input from the upper control device 13, and a q-axis current command value $i_q^*$ and a d-axis current command value $i_d^*$ are input from the current control unit 24. Then, the short circuit control unit 21 determines that emergency has occurred in the permanent magnet synchronous motor 6 if at least one of a difference between the rotation speed ω and the rotation speed command value ω*, a difference between the q-axis current $i_q$ and the q-axis current command value $i_q^*$, and a difference between the d-axis current $i_d$ and the d-axis current command value $i_d^*$ exceeds a predetermined value, and outputs the short circuit command S to the short-circuiting device 5.

The permanent magnet temperature acquisition unit 22 acquires a permanent magnet temperature $T_{magnet}$ of the permanent magnets 64a, 64b, 64c, and 64d. In the present embodiment, the permanent magnet temperature acquisition unit 22 has a table indicating a relationship among the permanent magnet temperature $T_{magnet}$, the rotation speed ω, the coil temperature $T_{coil}$, the q-axis current $i_q$, and the d-axis current $i_d$, and to the permanent magnet temperature acquisition unit 22, the rotation speed ω is input from the rotation speed calculation unit 9, the coil temperature $T_{coil}$ is input from the coil temperature sensor 10, and the q-axis current $i_q$ and the d-axis current $i_d$ are input from the q-axis current and d-axis current detection unit 11. Then, the permanent magnet temperature acquisition unit 22 acquires the permanent magnet temperature $T_{magnet}$, based on the rotation speed ω, the coil temperature $T_{coil}$, the q-axis current $i_q$, and the d-axis current $i_d$ that are input, and the table.

To the maximum current value determination unit 23, the permanent magnet temperature $T_{magnet}$ is input from the permanent magnet temperature acquisition unit 22, and the maximum current value determination unit 23 determines 2U the maximum current value $T_{MAX}$ of the current of the power lines 5U, 5V, and 5W to be determined in order to prevent irreversible demagnetization of the permanent magnets 64a, 64b, 64c, and 64d that may occur by transient d-axis current occurring at the time of the short-circuiting of the three phases, i.e., an extreme value $I_{dmax}$ of the d-axis current, based on a set of an irreversible demagnetization causing current value $I_{demag}$ corresponding to the permanent magnet temperature $T_{magnet}$ and the extreme value $I_{dmax}$ of the d-axis current, and inputs the maximum current value $I_{MAX}$ to the current control unit 24.

Figure 2:
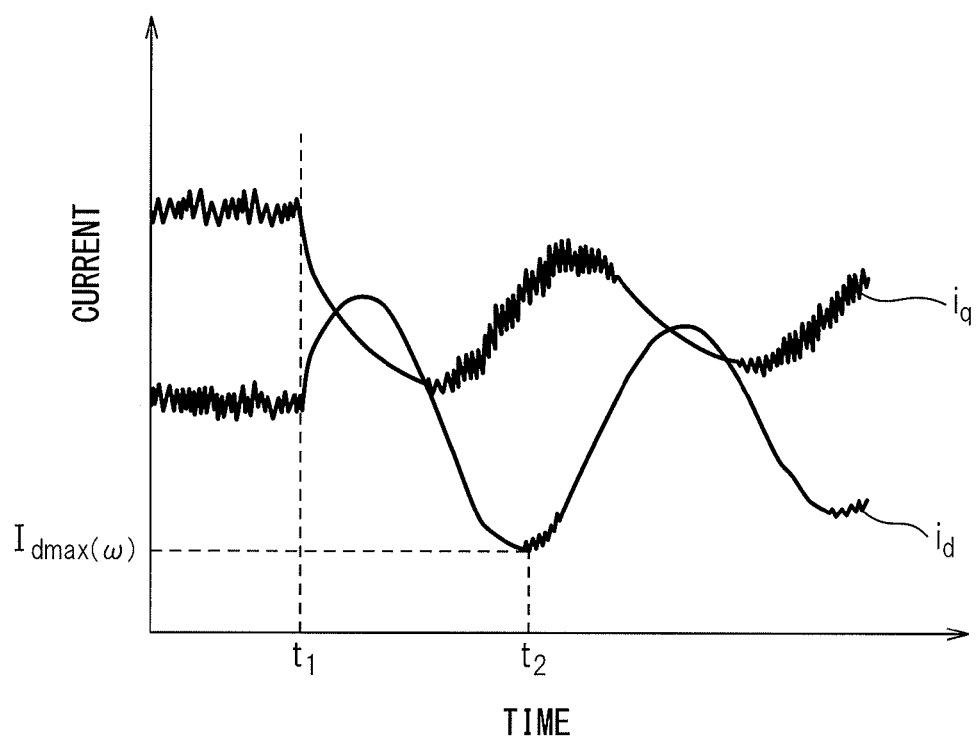
FIG. 2 is a diagram illustrating an example of waveforms of a q-axis current and a d-axis current before and after three phases of power lines of a permanent magnet synchronous motor are short-circuited.

The current control unit 24 controls the current of the power lines 5U, 5V, and 5W so that the current value of the power lines 5U, 5V, and 5W is less than the maximum current value $I_{MAX}$. FIG. 2 is a diagram illustrating an example of waveforms of the q-axis current and the d-axis current before and after the short-circuiting of the three phases of the power lines of the permanent magnet synchronous motor. As illustrate in FIG. 2, in the case where the three phases of the power lines 5U, 5V, and 5W are short-circuited at time t1, it is seen that an extreme value $I_{dmax}(\omega)$ of the d-axis current corresponding to the predetermined rotation speed ω occurs at time t2 because the transient d-axis current flows.

Figure 3A:
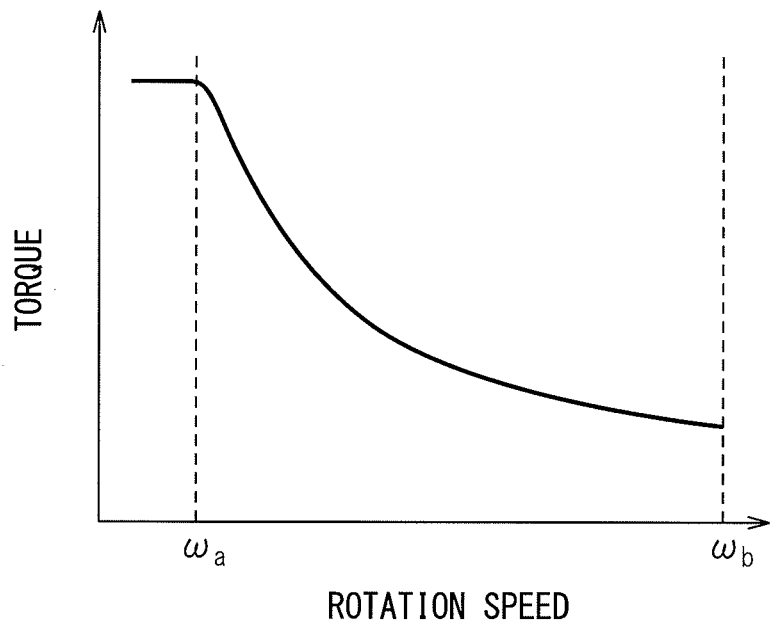
FIG. 3A is a diagram illustrating an example of a drive pattern at the time of the maximum load of the permanent magnet synchronous motor.
Figure 3B:
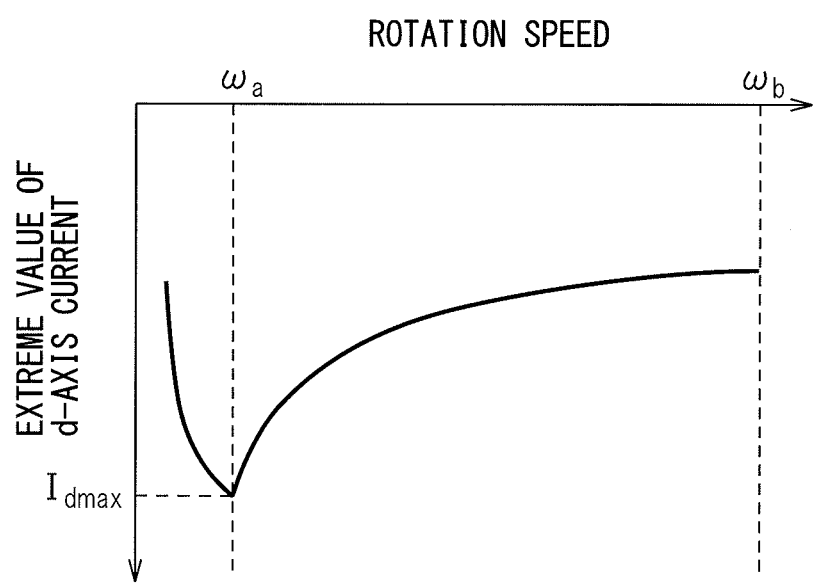
FIG. 3B is a diagram illustrating an extreme value of the d-axis current produced in the case where the three phases of the power lines are short-circuited at each rotation speed illustrated in FIG. 3A.

FIG. 3A is a diagram illustrating an example of a drive pattern at the time of the maximum load of the permanent magnet synchronous motor and FIG. 3B is a diagram illustrating an extreme value of the d-axis current occurring when the three phases of the power lines are short-circuited at each rotation speed illustrated in FIG. 3A. In the present embodiment, when the rotation speed ω of the permanent magnet synchronous motor is between a first rotation speed $\omega_a$ exceeding 0 and a second rotation speed $\omega_b$ higher than the first rotation speed $\omega_a$, control is performed so as to drive the permanent magnet synchronous motor 6 while suppressing the induced voltage caused by the permanent magnets 64a, 64b, 64c, and 64d by supplying the current including the d-axis current as the reactive current component, and therefore, high speed rotation drive is enabled. Further, as illustrated in FIG. 3B, in the case of the drive pattern as in FIG. 3A, the maximum value $I_{dmax}$ of the extreme value of the d-axis current occurs in the vicinity of the first rotation speed $\omega_a$ and the magnitude thereof is larger compared to the magnitude of the extreme value of the d-axis current at the second rotation speed $\omega_b$.

Figure 4:
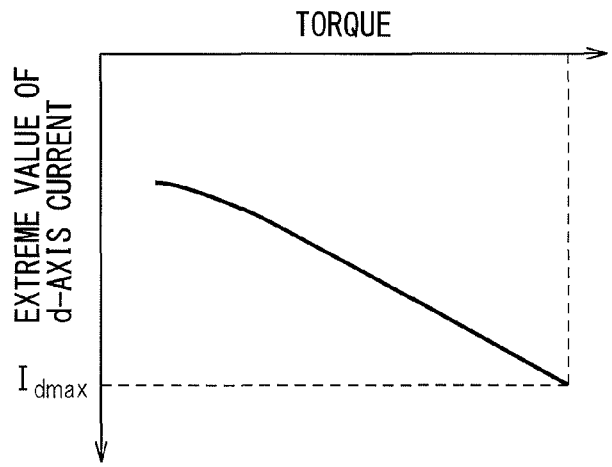
FIG. 4 is a diagram illustrating a relationship between the magnitude of the torque (load) generated by the permanent magnet synchronous motor and the extreme value of the d-axis current that can flow when the three phases of the power lines are short-circuited at the time of occurrence of each torque, at the first rotation speed $\omega_a$ illustrated in FIG. 3.

FIG. 4 is a diagram illustrating a relationship between the magnitude of the torque (load) generated by the permanent magnet synchronous motor and the extreme value of the d-axis current that can flow when the three phases of the power lines are short-circuited at the time of occurrence of each torque, at the first rotation speed $\omega_a$ illustrated in FIG. 3. As illustrated in FIG. 4, in the situation where the torque of the permanent magnet synchronous motor 6 is large, the extreme value of the d-axis current increases as the three phases of the power lines are short-circuited. Further, FIG. 4 also indicates that it is possible to indirectly adjust the maximum value $I_{dmax}$ of the extreme value of the d-axis current that may occur after the three phases of the power lines are short-circuited by controlling the maximum current value $I_{MAX}$ of the current that flows through the permanent magnet synchronous motor 6 because the magnitude of the torque depends on the magnitude of the current. That is, according to the present embodiment, by controlling the maximum current value $I_{MAX}$ of the current that flows through the permanent magnet synchronous motor 6 while it is being driven so that the maximum value $I_{dmax}$ of the extreme value of the d-axis current does not exceed the irreversible demagnetization causing current value $I_{demag}$, the irreversible demagnetization of the permanent magnets 64a, 64b, 64c, and 64d that may occur by the maximum value $I_{dmax}$ of the extreme value of the d-axis current occurring at the time of the short-circuiting of the three phases, is prevented.

In the present embodiment, the current control unit 24 has a torque command value generation unit 31, a current command value generation unit 32, a voltage command value generation unit 33, and a PWM signal generation unit 34. To the torque command value generation unit 31, the rotation speed ω is input from the rotation speed calculation unit 9, the rotation speed command ω* is input from the upper control device 13, and the maximum current value $I_{MAX}$ is input from the maximum current value determination unit 23. Then, the torque command value generation unit 31 generates a torque command value τ* based on the rotation speed ω, the rotation speed command ω*, and the maximum current value $I_{MAX}$ that are input, and outputs the torque command value τ* to the current command value generation unit 32.

To the current command value generation unit 32, the rotation speed ω is input from the rotation speed calculation unit 9 and the torque command value τ* is input from the torque command value generation unit 31. Then, the current command value generation unit 32 generates the q-axis current command value $i_q$* and the d-axis current command value $i_d$* based on the rotation speed ω and the torque command value τ* that are input.

To the voltage command value generation unit 33, the rotation speed ω is input from the rotation speed calculation unit 9, the q-axis current $i_q$ and the d-axis current $i_d$ are input from the q-axis current and d-axis current detection unit 11, and the q-axis current command value $i_q$* and the d-axis current command value $i_d$* are input from the current command value generation unit 32. Then, the voltage command value generation unit 33 generates a q-axis voltage command value $V_q$* and a d-axis voltage command value $V_d$* based on the rotation speed ω, the q-axis current $i_q$ and the d-axis current $i_d$, and the q-axis current command value $i_q$* and the d-axis current command value $i_d$* that are input.

To the PWM signal generation unit 34, the rotation angle θ is input from the rotation angle sensor 8, and the q-axis voltage command value $V_q$* and the d-axis voltage command value $V_d$* are input from the voltage command value generation unit 33. Then, the PWM signal generation unit 34 generates the PWM signals $V_U$*, $V_V$*, and $V_W$* to turn on and off the transistors of the inverter 4 based on the rotation angle θ, and the q-axis voltage command value $V_q$* and the d-axis voltage command value $V_d$* that are input.

The upper control device 13 consists of a CNC (computer numerical control), etc., and inputs the rotation speed command value ω* to the short circuit control unit 21 and the torque command value generation unit 31.

Figure 5:
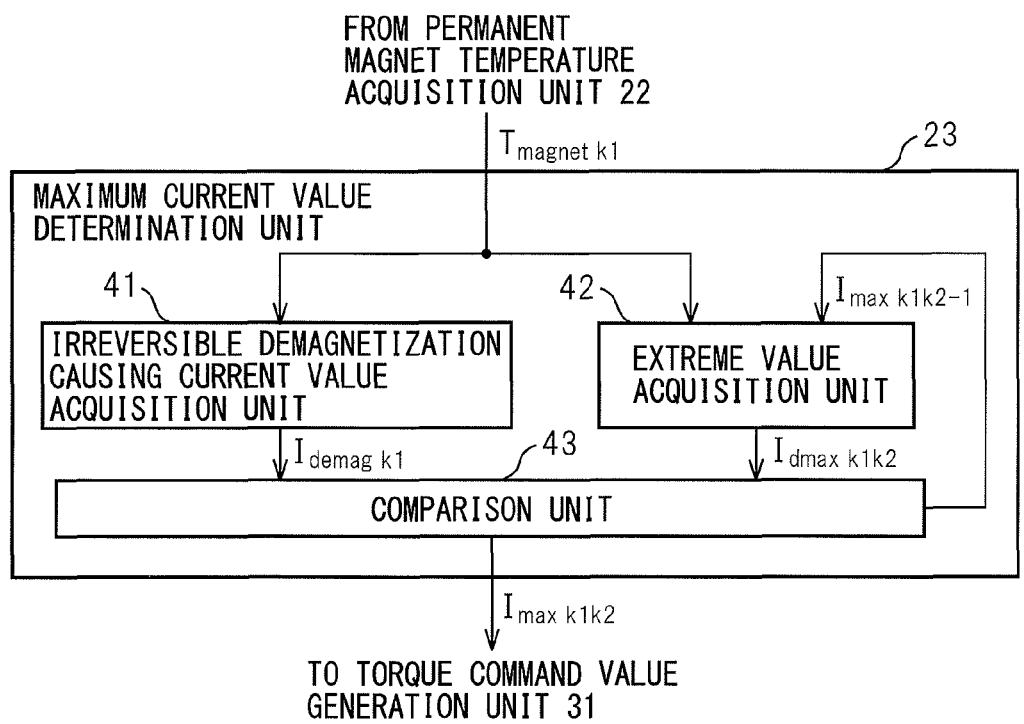
FIG. 5 is a block diagram illustrating an example of the maximum current value determination unit in FIG. 1 in detail.

FIG. 5 is a block diagram illustrating an example of the maximum current value determination unit in FIG. 1 in detail. In FIG. 5, the maximum current value determination unit 23 determines the maximum current value $I_{MAX}$ based on a set of an irreversible demagnetization causing current value $I_{demagk1}$ (k1 is an integer not less than one and not more than n1) corresponding to a permanent magnet temperature $T_{magnetk1}$ and a maximum value $I_{dmaxk1k2}$ (k2 is an integer not less than one and not more than n2) of the extreme value of the d-axis current, and inputs the maximum current value $I_{MAX}$ to the current control unit 24. To do this, the maximum current value determination unit 23 has an irreversible demagnetization causing current value acquisition unit 41, an extreme value acquisition unit 42, and a comparison unit 43.

The irreversible demagnetization causing current value acquisition unit 41 stores a table indicating a relationship between the permanent magnet temperature $T_{magnetk1}$ and the irreversible demagnetization causing current value $I_{demagk1}$. For example, it is possible to obtain the irreversible demagnetization causing current value $I_{demagk1}$ from the permanent magnet temperature set in advance and the characteristics of the irreversible demagnetization causing magnetic field using the finite element method (FEM). In this case, the permanent magnet temperature $T_{magnetk1}$ corresponds to the permanent magnet temperature $T_{magnet}$ illustrated in FIG. 1. Consequently, the table stored in the irreversible demagnetization causing current value acquisition unit 41 sets the number n1 of irreversible demagnetization causing current values corresponding to the number n1 of permanent magnet temperatures, respectively. Then, when the permanent magnet temperature $T_{magnetk1}$ is input from the permanent magnet temperature acquisition unit 22, the irreversible demagnetization causing current value acquisition unit 41 searches for the irreversible demagnetization causing current value $I_{demagk1}$ corresponding to the permanent magnet temperature $T_{magnetk1}$ from the table and outputs the irreversible demagnetization causing current value $I_{demagk1}$ that is searched for to the comparison unit 43.

The extreme value acquisition unit 42 stores a table indicating a relationship among the permanent magnet temperature $T_{magnetk1}$ the maximum value $I_{dmaxk1k2}$ of the extreme value of the d-axis current, and a maximum current value $I_{maxk1k2}$. In this case, the maximum current value $I_{maxk1k2}$ corresponds to the maximum current value $I_{MAX}$ illustrated in FIG. 1. Consequently, the table stored in the extreme value acquisition unit 42 sets the maximum value of the extreme value of the d-axis current in each set (of n1×n2 sets) of the number n1 of permanent magnet temperatures and the number n2 of maximum current values. Then, when the permanent magnet temperature $T_{magnetk1}$ is input from the permanent magnet temperature acquisition unit 22 and also the maximum current value $I_{maxk1k2}$ is fed back from the comparison unit 43 (in FIG. 5, an example in which a maximum current value $I_{maxk1k2-1}$ is fed back to the extreme value acquisition unit 42 is illustrated), as will be explained later, the extreme value acquisition unit 42 searches for the maximum value $I_{dmaxk1k2}$ of the extreme value of the d-axis current corresponding to the permanent magnet temperature $T_{magnetk1}$ and the maximum current value $I_{maxk1k2}$ and outputs the maximum value $I_{dmaxk1k2}$ of the extreme value of the d-axis current that is searched for to the comparison unit 43.

The extreme value of the d-axis current that may occur at a predetermined operation point when the three phases of the power lines 5U, 5V, and 5W are short-circuited can be obtained by calculating current responses when the left side is set to zero in a voltage equation in the dq coordinate system of the permanent magnet synchronous motor 6 expressed by $$\begin{bmatrix} V_d \\ V_q \end{bmatrix} = \begin{bmatrix} R + pL_d & -\omega_{re}L_q \\ \omega_{re}L_d & R + PL_q \end{bmatrix} \begin{bmatrix} i_d \\ i_q \end{bmatrix} + \begin{bmatrix} 0 \\ \omega_{re}\phi \end{bmatrix}$$

i.e., a d-axis current $I_{D0}$ immediately before the short-circuiting of the three phases of the power lines 5U, 5V, and 5W, a q-axis current $I_{Q0}$ immediately before the short-circuiting of the three phases of the power lines 5U, 5V, and 5W, and a rotation speed (electric angle frequency) $\omega_0$, and by substituting the d-axis current $I_{D0}$, the q-axis current $I_{Q0}$, and the rotation speed $\omega_0$ that are calculated in a formula $$I_{dmax}(\omega_0) = Ae^{-\alpha t_m}\sin(Bt_m + C) + K$$

$$t_m = \left[n\pi + \tan^{-1}\left(\frac{B}{a}\right) - C\right]/B$$

where $A = f(I_{D0}, I_{Q0}, \omega_0)$, $B = g(\omega_0)$ $C = h(I_{D0}, I_{Q0}, \omega_0)$, and a and K are constants. The maximum value $I_{dmaxk1k2}$ of the extreme value of the d-axis current corresponds to the maximum extreme value of the d-axis current that is obtained for each rotation speed of the drive pattern at the maximum current value $I_{maxk1k2}$ (the extreme value $I_{dmax}$ when $\omega_0 = \omega_a$ in the drive pattern illustrated in FIG. 3A).

To the comparison unit 43, the irreversible demagnetization causing current value $I_{demagk1}$ is input from the irreversible demagnetization causing current value acquisition unit 41 and the maximum value $I_{dmaxk1k2}$ of the extreme value is input from the extreme value acquisition unit 42. Then, the comparison unit 43 determines whether or not the absolute value of the irreversible demagnetization causing current value $I_{demagk1}$ is larger than the absolute value of the maximum value $I_{dmaxk1k2}$ of the extreme value of the d-axis current.

If the absolute value of the irreversible demagnetization causing current value $I_{demagk1}$ is larger than the absolute value of the maximum value $I_{dmaxk1k2}$ of the extreme value of the d-axis current, the comparison unit 43 determines that the irreversible demagnetization of the permanent magnets 64a, 64b, 64c, and 64d caused by the transient current occurring at the time of the short-circuiting of the three phases does not occur, and outputs the maximum current value $I_{maxk1k2}$ to the torque command value generation unit 31 as the maximum current value $I_{MAX}$. That is, the maximum current value determination unit 23 does not change the maximum current value $I_{MAX}$ from the initial value.

In contrast, if the absolute value of the irreversible demagnetization causing current value $I_{demagk1}$ is equal to or less than the absolute value of the maximum value $I_{dmaxk1k2}$ of the extreme value of the d-axis current, the comparison unit 43 determines that the irreversible demagnetization of the permanent magnets 64a, 64b, 64c, and 64d caused by the transient current occurring at the time of the short-circuiting of the three phases may occur, and feeds back the maximum current value $I_{maxk1k2-1}$ corresponding to the maximum current value $I_{maxk1k2}$ from which a predetermined positive amount $\Delta I$ is subtracted, to the extreme value acquisition unit 42. Then, the extreme value acquisition unit 42 acquires a maximum current value $I_{dmaxk1k2-1}$ of the extreme value of the d-axis current in a similar manner and outputs the acquired maximum current value $I_{dmaxk1k2-1}$ of the extreme value of the d-axis current to the comparison unit 43 (in FIG. 5, a case where the maximum current value $I_{dmaxk1k2}$ of the extreme value of the d-axis current is output to the comparison unit 43 is illustrated). Consequently, the feeding back of the maximum current value from the comparison unit 43 to the extreme value acquisition unit 42 and the comparison between the absolute value of the irreversible demagnetization causing current value and the absolute value of the maximum value of the extreme value of the d-axis current in the comparison unit 43 as described above are repeated until the absolute value of the irreversible demagnetization causing current value becomes larger than the absolute value of the maximum value of the extreme value of the d-axis current.

According to the above-mentioned embodiment, the maximum current value $I_{MAX}$ is set to the value with which it is possible to prevent the irreversible demagnetization of the permanent magnets 64a, 64b, 64c, and 64d that may occur by the transient d-axis current occurring when the three phases of the power lines 5U, 5V, and 5W are short-circuited, and therefore, it is possible to prevent the irreversible demagnetization of the permanent magnets 64a, 64b, 64c, and 64d caused by the transient d-axis current occurring when the three phases of the power lines 5U, 5V, and 5W are short-circuited.

FIG. 6 is a block diagram illustrating another example of the maximum current value determination unit in detail. In FIG. 6, a maximum current value determination unit 23a is used in place of the maximum current value determination unit 23 of the motor control unit 12 illustrated in FIG. 1, and determines the maximum current value $I_{MAX}$ based on a set of an irreversible demagnetization causing magnetic field intensity $H_{demagk1}$ corresponding to the permanent magnet temperature $T_{magnet}$ and a maximum value $H_{dmaxk1k2}$ of the extreme value of the demagnetization field occurring by the d-axis current, and inputs the maximum current value $I_{MAX}$ to the motor control unit 12. To do this, the maximum current value determination unit 23a has an irreversible demagnetization causing magnetic field intensity acquisition unit 41a, an extreme value acquisition unit 42a, and a comparison unit 43a.

The irreversible demagnetization causing magnetic field intensity acquisition unit 41a stores a table indicating a relationship between the permanent magnet temperature $T_{magnetk1}$ and the irreversible demagnetization causing magnetic field intensity $H_{demagk1}$. In this case also, the permanent magnet temperature $T_{magnetk1}$ corresponds to the permanent magnet temperature $T_{magnet}$ illustrated in FIG. 1. Consequently, the table stored in the irreversible demagnetization causing magnetic field intensity acquisition unit 41a sets the number n1 of irreversible demagnetization causing magnetic field intensities corresponding to the number n1 of permanent magnet temperatures, respectively. Then, when the permanent magnet temperature $T_{magnetk1}$ is input from the permanent magnet temperature acquisition unit 22, the irreversible demagnetization causing magnetic field intensity acquisition unit 41a searches for the irreversible demagnetization causing magnetic field intensity $H_{demagk1}$ corresponding to the permanent magnet temperature $T_{magnetk1}$ from the above-mentioned table, and outputs the irreversible demagnetization causing magnetic field intensity $H_{demagk1}$ that is searched for to the comparison unit 43a.

The extreme value acquisition unit 42a stores a table indicating a relationship among the permanent magnet temperature $T_{magnetk1}$ the maximum value $H_{dmaxk1k2}$ of the extreme value of the demagnetization field, and the maximum current value $I_{maxk1k2}$. In this case also, the maximum current value $I_{maxk1k2}$ corresponds to the maximum current value $I_{MAX}$ illustrated in FIG. 1. Consequently, the table stored in the extreme value acquisition unit 42a sets the maximum value of the extreme value of the demagnetization filed in each set (of n1×n2 sets) of the number n1 of permanent magnet temperatures and the number n2 of maximum current values. Then, when the permanent magnet temperature $T_{magnetk1}$ is input from the permanent magnet temperature acquisition unit 22 and also, the maximum current value $I_{maxk1k2}$ is fed back from the comparison unit 43a (in FIG. 6, an example in which the maximum current value $I_{maxk1k2-1}$ is fed back to the extreme value acquisition unit 42a is illustrated), as will be explained later, the extreme value acquisition unit 42a searches for the maximum value $H_{dmaxk1k2}$ of the extreme value of the demagnetization field corresponding to the permanent magnet temperature $T_{magnetk1}$ and the maximum current value $I_{maxk1k2}$, and outputs the maximum value $H_{dmaxk1k2}$ of the extreme value of the demagnetization field that is searched for to the comparison unit 43a.

To the comparison unit 43a, the irreversible demagnetization causing magnetic field intensity $H_{demagk1}$ is input from the irreversible demagnetization causing magnetic field intensity acquisition unit 41a and the maximum value $H_{dmaxk1k2}$ of the extreme value of the demagnetization field is input from the extreme value acquisition unit 42a. Then, the comparison unit 43a determines whether or not the absolute value of the irreversible demagnetization causing magnetic field intensity $H_{demagk1}$ is larger than the absolute value of the maximum value $H_{dmaxk1k2}$ of the extreme value of the demagnetization field.

If the absolute value of the irreversible demagnetization causing magnetic field intensity $H_{demagk1}$ is larger than the absolute value of the maximum value $H_{dmaxk1k2}$ of the extreme value of the demagnetization field, the comparison unit 43a determines that the irreversible demagnetization of the permanent magnets 64a, 64b, 64c, and 64d caused by the transient current occurring at the time of the short-circuiting of the three phases does not occur, and outputs the maximum current value $I_{maxk1k2}$ to the torque command value generation unit 31 as the maximum current value $I_{MAX}$. That is, the maximum current value determination unit 23a does not change the maximum current value $I_{MAX}$ from the initial value.

In contrast, if the absolute value of the irreversible demagnetization causing magnetic field intensity $H_{demagk1}$ is equal to or less than the absolute value of the maximum value $H_{dmaxk1k2}$ of the extreme value of the demagnetization field, the comparison unit 43a determines that the irreversible demagnetization of the permanent magnets 64a, 64b, 64c, and 64d caused by the transient current occurring at the time of the short-circuiting of the three phases may occur, and feeds back the maximum current value $I_{maxk1k2-1}$ corresponding to the maximum current value $I_{maxk1k2}$ from which the predetermined positive amount $\Delta I$ is subtracted to the extreme value acquisition unit 42a. Then, the extreme value acquisition unit 42a acquires a maximum value $H_{dmaxk1k2-1}$ of the extreme value of the demagnetization field in a similar manner and outputs the acquired maximum value $H_{dmaxk1k2-1}$ of the extreme value of the demagnetization field to the comparison unit 43a (in FIG. 6, a case where the maximum value $H_{dmaxk1k2}$ of the extreme value of the demagnetization field is output to the comparison unit 43a is illustrated). Consequently, the feeding back of the maximum current value from the comparison unit 43a to the extreme value acquisition unit 42a and the comparison between the absolute value of the irreversible demagnetization causing magnetic field intensity and the absolute value of the maximum value of the extreme value of the demagnetization field described above are repeated until the absolute value of the irreversible demagnetization causing magnetic field intensity becomes larger than the absolute value of the maximum value of the extreme value of the demagnetization field.

According to the above-mentioned embodiment, the maximum value of the extreme value of the demagnetization field is used in place of the maximum value of the extreme value of the d-axis current in order to determine the maximum current value $I_{MAX}$, and therefore, there are no longer bad influences because of magnetism saturation, etc., when determining the maximum current value $I_{MAX}$.

FIG. 7 is a block diagram illustrating another example of the maximum current value determination unit in detail. In FIG. 7, a maximum current value determination unit 23b is used in place of the maximum current value determination unit 23 of the motor control unit 12 illustrated in FIG. 1, and determines the maximum current value $I_{MAX}$ based on a set of an extreme value $I_{dmaxk1k2}(\omega)$ of the d-axis current set for each rotation speed $\omega$ corresponding to the permanent magnet temperature $T_{magnet}$ and a maximum current value $I_{maxk1k2}(\omega)$ set for each rotation speed $\omega$, and inputs the maximum current value $I_{MAX}$ to the motor control unit 12. To do this, the maximum current value determination unit 23b has the irreversible demagnetization causing current value acquisition unit 41, an extreme value acquisition unit 42b, and a comparison unit 43b.

The extreme value acquisition unit 42b stores a table indicating a relationship between the permanent magnet temperature $T_{magnetk1}$, the extreme value $I_{dmaxk1k2}(\omega)$ of the d-axis current, and the maximum current value $I_{maxk1k2}(\omega)$. In this case also, the maximum current value $I_{maxk1k2}(\omega)$ corresponding to the maximum current value $I_{MAX}$ illustrated in FIG. 1. Consequently, the table stored in the extreme value acquisition unit 42b sets the extreme value of the d-axis current in each set (of n1×n2 sets) of the number n1 of permanent magnet temperatures and the number n2 of maximum current values for each rotation speed $\omega$. Then, when the permanent magnet temperature $T_{magnetk1}$ is input from the permanent magnet temperature acquisition unit 22 and also, the maximum current value $I_{maxk1k2}(\omega)$ is fed back from the comparison unit 43b (in FIG. 7, an example in which a maximum current value $I_{maxk1k2-1}(\omega)$ is fed back to the extreme value acquisition unit 42b is illustrated), as will be explained later, the extreme value acquisition unit 42b searches for the extreme value $I_{dmaxk1k2}(\omega)$ of the d-axis current corresponding to the permanent magnet temperature $T_{magnetk1}$ and the maximum current value $I_{maxk1k2}(\omega)$, and outputs the extreme value $I_{dmaxk1k2}(\omega)$ of the d-axis current set for each rotation speed $\omega$ that is searched for to the comparison unit 43b.

To the comparison unit 43b, the irreversible demagnetization causing current value $I_{demagk1}$ is input from the irreversible demagnetization causing current value acquisition unit 41 and the extreme value $I_{dmaxk1k2}(\omega)$ of the d-axis current is input from the extreme value acquisition unit 42b. Then, the comparison unit 43b determines whether or not the absolute value of the irreversible demagnetization causing current value $I_{demagk1}$ is larger than the absolute value of the extreme value $I_{dmaxk1k2}(\omega)$ of the d-axis current (the extreme value of the d-axis current corresponding to the current rotation speed $\omega$).

If the absolute value of the irreversible demagnetization causing current value $I_{demagk1}$ is larger than the absolute value of the extreme value $I_{dmaxk1k2}(\omega)$ of the d-axis current, the comparison unit 43b determines that the irreversible demagnetization of the permanent magnets 64a, 64b, 64c, and 64d caused by the transient current occurring at the time of the short-circuiting of the three phases does not occur, and outputs the maximum current value $I_{maxk1k2}(\omega)$ to the torque command value generation unit 31 as the maximum current value $I_{MAX}$. That is, the maximum current value determination unit 23b does not change the maximum current value $I_{MAX}$ from the initial value.

In contrast, if the absolute value of the irreversible demagnetization causing current value $I_{demagk1}$ is equal to or less than the absolute value of the extreme value $I_{dmaxk1k2}(\omega)$ of the d-axis current, the comparison unit 43b determines that the irreversible demagnetization of the permanent magnets 64a, 64b, 64c, and 64d caused by the transient current occurring at the time of the short-circuiting of the three phases may occur, and feeds back the maximum current value $I_{maxk1k2-1}(\omega)$ corresponding to the maximum current value $I_{maxk1k2}(\omega)$ from which the predetermined positive amount $\Delta I$ is subtracted to the extreme value acquisition unit 42. Then, the extreme value acquisition unit 42 acquires the extreme value $I_{dmaxk1k2}(\omega)$ of the d-axis current in a similar manner and outputs the acquired extreme value $I_{dmaxk1k2}(\omega)$ of the d-axis current to the comparison unit 43b (in FIG. 7, a case where the extreme value $I_{dmaxk1k2}(\omega)$ of the d-axis current is output to the comparison unit 43b is illustrated). Consequently, the feeding back of the maximum current value from the comparison unit 43b to the extreme value acquisition unit 42b and the comparison between the absolute value of the irreversible demagnetization causing current value and the absolute value of the extreme value of the d-axis current in the comparison unit 43b described above are repeated until the absolute value of the irreversible demagnetization causing current value becomes larger than the absolute value of the extreme value of the d-axis current.

According to the above-described embodiment, the maximum current value $I_{MAX}$ can be set for each rotation speed $\omega$, and therefore, it is possible to make the restrictions on the current by the current control unit 24 less severe compared to the case where the maximum current value $I_{MAX}$ is set based on the maximum current value $I_{dmaxk1k2}$ of the extreme value of the d-axis current.

Figure 8:
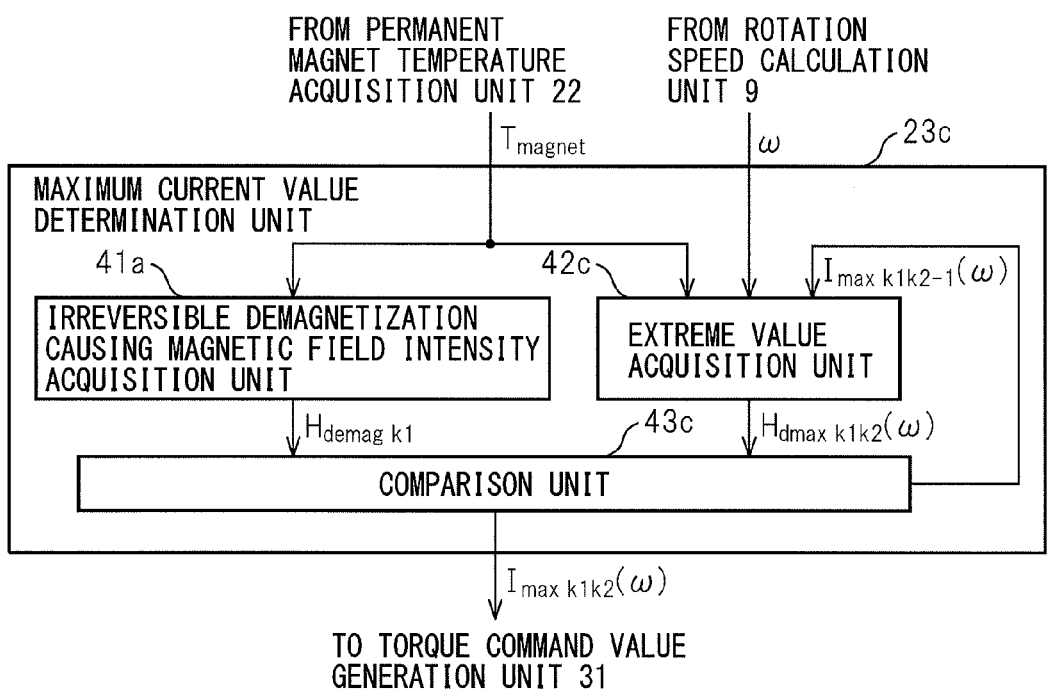
FIG. 8 is a block diagram illustrating another example of the maximum current value determination unit in detail.

FIG. 8 is a block diagram illustrating another example of the maximum current value determination unit in detail. In FIG. 8, a maximum current value determination unit 23c is used in place of the maximum current value determination unit 23 of the motor control device 12, and determines the maximum current value $I_{MAX}$ based on a set of an extreme value $H_{dmaxk1k2}(\omega)$ of the demagnetization field set for each rotation speed $\omega$ corresponding to the permanent magnet temperature $T_{magnet}$ and the maximum current value $I_{maxk1k2}(\omega)$ set for each rotation speed $\omega$, and inputs the maximum current value $I_{MAX}$ to the motor control unit 12. To do this, the maximum current value determination unit 23c has the irreversible demagnetization causing current value acquisition unit 41a, an extreme value acquisition unit 42c, and a comparison unit 43c.

The extreme value acquisition unit 42c stores a table indicating a relationship among the permanent magnet temperature $T_{magnetk1}$ the extreme value $H_{dmaxk1k2}(\omega)$) of the demagnetization field, and the maximum current value $I_{maxk1k2}(\omega)$. In this case also, the maximum current value $I_{maxk1k2}(\omega)$ corresponds to the maximum current value $I_{MAX}$ illustrated in FIG. 1. Consequently, the table stored in the extreme value acquisition unit 42c sets the extreme value of the demagnetization field in each set (of n1×n2 sets) of the number n1 of permanent magnet temperatures and the number n2 of maximum current values for each rotation speed $\omega$. Then, when the permanent magnet temperature $T_{magnetk1}$ is input from the permanent magnet temperature acquisition unit 22 and also, the maximum current value $I_{maxk1k2}(\omega)$ is fed back from the comparison unit 43c (in FIG. 8, an example in which the maximum current value $I_{maxk1k2-1}(\omega)$ is fed back to the extreme value acquisition unit 42c is illustrated), as will be explained later, the extreme value acquisition unit 42c searches for the extreme value $H_{dmaxk1k2}(\omega)$ of the demagnetization field corresponding to the permanent magnet temperature $T_{magnetk1}$ and the maximum current value $I_{maxk1k2}$ (o), and outputs the extreme value $H_{dmaxk1k2}(\omega)$ of the demagnetization field that is searched for to the comparison unit 43c.

To the comparison unit 43c, the irreversible demagnetization causing magnetic field intensity $H_{demagk1}$ is input from the irreversible demagnetization causing magnetic field intensity acquisition unit 41a and the extreme value $H_{dmaxk1k2}(\omega)$ of the demagnetization field is input from the extreme value acquisition unit 42c. Then, the comparison unit 43c determines whether or not the absolute value of the irreversible demagnetization causing magnetic field intensity $H_{demagk1}$ is larger than the absolute value of the extreme value $H_{dmaxk1k2}(\omega)$ of the demagnetization field.

If the absolute value of the irreversible demagnetization causing magnetic field intensity $H_{demagk1}$ is larger than the absolute value of the extreme value $H_{dmaxk1k2}(\omega)$ of the demagnetization field, the comparison unit 43c determines that the irreversible demagnetization of the permanent magnets 64a, 64b, 64c, and 64d caused by the transient current occurring at the time of the short-circuiting of the three phases does not occur, and outputs the maximum current value $I_{maxk1k2}(\omega)$ to the torque command value generation unit 31 as the maximum current value $I_{MAX}$. That is, the maximum current value determination unit 23c does not change the maximum current value $I_{MAX}$ from the initial value.

In contrast, if the absolute value of the irreversible demagnetization causing magnetic field intensity $H_{demagk1}$ is equal to or less than the absolute value of the extreme value $H_{dmaxk1k2}(\omega)$ of the demagnetization field, the comparison unit 43c determines that the irreversible demagnetization of the permanent magnets 64a, 64b, 64c, and 64d caused by the transient current occurring at the time of the short-circuiting of the three phases may occur, and feeds back the maximum current value $I_{maxk1k2-1}(\omega)$ corresponding to the maximum current value $I_{maxk1k2}(\omega)$ from which the predetermined positive amount $\Delta I$ is subtracted to the extreme value acquisition unit 42c. Then, the extreme value acquisition unit 42c acquires an extreme value $H_{dmaxk1k2-1}(\omega)$ of the demagnetization field in a manner similar to that described above, and outputs the acquired extreme value $H_{dmaxk1k2-1}(\omega)$ of the demagnetization field to the comparison unit 43c (in FIG. 8, a case where the extreme value $H_{dmaxk1k2}(\omega)$ of the demagnetization field is output to the comparison unit 43c is illustrated). Consequently, the feeding back of the maximum current value from the comparison unit 43c to the extreme value acquisition unit 42c and the comparison between the absolute value of the irreversible demagnetization causing magnetic field intensity and the absolute value of the extreme value of the demagnetization field in the comparison unit 43c described above are repeated until the absolute value of the irreversible demagnetization causing magnetic field intensity becomes larger than the absolute value of the extreme value of the demagnetization field.

According to the above-mentioned embodiment, the extreme value of the demagnetization field is used in place of the maximum value of the extreme value of the d-axis current in order to determine the maximum current value $I_{MAX}$, and therefore, there are no longer bad influences because of magnetism saturation, etc., when determining the maximum current value $I_{MAX}$, and therefore, it is possible to make the restrictions on the current by the current control unit 24 less severe compared to the case where the maximum current value $I_{MAX}$ is set based on the maximum value $H_{dmaxk1k2}$ of the extreme value of the demagnetization field.

The present invention is not limited to the above-mentioned embodiments and there can be a number of alterations and modifications. For example, in the above-mentioned embodiments, the case where the rotary permanent magnet synchronous motor in which the permanent magnets 64a, 64b, 64c, and 64d are provided in the rotor 62 is used as the permanent magnet synchronous motor 6 is explained, however, it is possible to use a rotary permanent magnet synchronous motor in which permanent magnets are provided in the stator, a linear permanent magnet synchronous motor in which permanent magnets are provided in any one of a stator and a needle, etc., as the permanent magnet synchronous motor 6.

Further, the rotation angle sensor 8 can consist of a part (for example, hole element or resolver) other than the rotary encoder. Furthermore, it is also possible to omit the rotation angle sensor 8 and to calculate the rotation angle θ and the rotation speed ω based on the alternating current and alternating-current voltage supplied to the permanent magnet synchronous motor 6.

In the above-mentioned embodiments, the case where any two phases (in the above-mentioned embodiments, U-phase current $I_U$ and the V-phase current $I_V$) among the three phases of the U-phase current $I_U$, the V-phase current $I_V$, and the W-phase current $I_W$ are used in order to detect the q-axis current $I_q$ and the d-axis current $I_d$ is explained, however, it is also possible to detect the q-axis current $I_q$ and the d-axis current $I_d$ by using all the three phases of the U phase current $I_U$, the V-phase current $I_V$, and the W-phase current $I_W$.

Further, in the above-described embodiments, the case where the permanent magnet temperature $T_{magnet}$ is acquired by using the table indicating the relationship among the permanent magnet temperature $T_{magnet}$, the rotation speed ω, the coil temperature $T_{coil}$, the q-axis current $i_q$, and the d-axis current $i_d$ is explained, however, it is also possible to acquire the permanent magnet temperature $T_{magnet}$ by using the voltage equation of the permanent magnet synchronous motor 6, or by directly measuring the temperature of the permanent magnets 64a, 64b, 64c, and 64d.

In the above-mentioned embodiments, the case where the vector control for independently controlling the q-axis current and the d-axis current of the permanent magnet synchronous motor 6 is performed is explained, however, it is possible to apply the present invention to the case where the vector control is not performed.

Further, in the above-mentioned embodiments, the case where the extreme value acquisition units 42 and 42b use the table is explained, however, it is also possible for the extreme value acquisition units 42 and 42b to perform real-time calculation based on the above-mentioned equation.

Furthermore, the case where the upper control device 13 is used in order to output the rotation speed command value ω* is explained, however, it is also possible to use a control device other than the upper control device 13 in order to output the rotation speed command value ω*.

As above, the present invention is explained in relation to the preferred embodiments thereof, however, persons skilled in the art should understand that there can be a variety of alterations and modifications without deviating from the scope of claims, as described later.

The invention claimed is:

1. A control device of a permanent magnet synchronous motor, comprising:
   a short circuit control unit configured to cause a short-circuiting device to short-circuit three phases of power lines of a permanent magnet synchronous motor in order to safely stop the permanent magnet synchronous motor at emergency of the permanent magnet synchronous motor;
   a permanent magnet temperature acquisition unit configured to acquire permanent magnet temperature of a permanent magnet of the permanent magnet synchronous motor;
   a maximum current value determination unit configured to determine the maximum current value of a permanent magnet synchronous motor for each rotation speed of the permanent magnet synchronous motor determined to prevent irreversible demagnetization of a permanent magnet of the permanent magnet synchronous motor from occurring due to transient current occurring at the time of short-circuiting of three phases, based on one of a set of irreversible demagnetization causing current value corresponding to the permanent magnet temperature and the transient current occurring at the time of the short-circuiting of three phases, and a set of irreversible demagnetization causing magnetic field intensity corresponding to the permanent magnet temperature and demagnetization field intensity of the permanent magnet of the permanent magnet synchronous motor occurring at the time of the short-circuiting of three phases; and
   a current control unit configured to control the current of the permanent magnet synchronous motor so that the current value of the permanent magnet synchronous motor becomes less than the maximum current value.

2. A control system, comprising:
   a permanent magnet synchronous motor; and
   a control device of the permanent magnet synchronous motor, the control device comprising:
      a short circuit control unit configured to cause a short-circuiting device to short-circuit three phases of power lines of a permanent magnet synchronous motor in order to safely stop the permanent magnet synchronous motor at emergency of the permanent magnet synchronous motor;

a permanent magnet temperature acquisition unit configured to acquire permanent magnet temperature of a permanent magnet of the permanent magnet synchronous motor;

a maximum current value determination unit configured to determine the maximum current value of a permanent magnet synchronous motor for each rotation speed of the permanent magnet synchronous motor determined to prevent irreversible demagnetization of a permanent magnet of the permanent magnet synchronous motor from occurring due to transient current occurring at the time of short-circuiting of three phases, based on one of a set of irreversible demagnetization causing current value corresponding to the permanent magnet temperature and the transient current occurring at the time of the short-circuiting of three phases, and a set of irreversible demagnetization causing magnetic field intensity corresponding to the permanent magnet temperature and demagnetization field intensity of the permanent magnet of the permanent magnet synchronous motor occurring at the time of the short-circuiting of three phases; and a current control unit configured to control the current of the permanent magnet synchronous motor so that the current value of the permanent magnet synchronous motor becomes less than the maximum current value.

\* \* \* \* \*